US010804579B2

(12) United States Patent
Joswig et al.

(10) Patent No.: US 10,804,579 B2
(45) Date of Patent: Oct. 13, 2020

(54) BATTERY SYSTEM WITH ELASTIC HOSE

(71) Applicant: Johnson Controls Hybrid and Recycling GmbH, Hannover (DE)

(72) Inventors: Ralf Joswig, Bucholz (DE); Martin Wiegmann, Borstel (DE); Helge Brenner, Hannover (DE)

(73) Assignee: CLARIOS TECHNOLOGY AND RECYCLING GMBH, Hannover (DE)

( * ) Notice: Subject to any disclaimer, the term of this patent is extended or adjusted under 35 U.S.C. 154(b) by 672 days.

(21) Appl. No.: 15/474,962

(22) Filed: Mar. 30, 2017

(65) Prior Publication Data

US 2017/0207505 A1  Jul. 20, 2017

Related U.S. Application Data

(63) Continuation of application No. 13/880,685, filed as application No. PCT/EP2011/005113 on Oct. 12, 2011, now abandoned.

(30) Foreign Application Priority Data

Oct. 21, 2010 (DE) ......................... 10 2010 049 015

(51) Int. Cl.
*H01M 10/633* (2014.01)
*F16L 11/12* (2006.01)
(Continued)

(52) U.S. Cl.
CPC ......... *H01M 10/633* (2015.04); *F16L 11/121* (2013.01); *F16L 11/122* (2013.01);
(Continued)

(58) Field of Classification Search
CPC ........... H01M 2/1077; H01M 10/6568; H01M 10/633; H01M 10/486; H01M 2220/20;
(Continued)

(56) References Cited

U.S. PATENT DOCUMENTS 3,851,646 A   12/1974   Sams
5,568,944 A   10/1996   Kawasaki
(Continued)

FOREIGN PATENT DOCUMENTS

DE   8808680    8/1988
DE   19501615   8/1996
(Continued)

OTHER PUBLICATIONS

International Search Report for Application No. PCT/EP2011/005113 dated Feb. 23, 2012.

*Primary Examiner* — Gregg Cantelmo
(74) *Attorney, Agent, or Firm* — Christopher & Weisberg, P.A.

(57) ABSTRACT

A battery system having a hose made from an elastic material. The hose is designed to be fitted on a hose connection by pushing a hose endpiece of the hose over the hose connection. The hose endpiece is designed to be fastened on the hose connection by a hose clip that is arranged in a fitting region of the hose endpiece. The hose endpiece has at least one thickened area which protrudes from the outer side of the hose. The thickened area protrudes from the outer side of the hose to such an extent that a hose clip suitable for fastening the hose on the hose connection is held on the hose endpiece by the thickened area with respect to the influence of gravity in the longitudinal direction of the hose endpiece. The hose may have multiple branch-off points.

12 Claims, 7 Drawing Sheets

(51) Int. Cl.
  *F16L 33/28* (2006.01)
  *F16L 33/025* (2006.01)
  *F16L 33/02* (2006.01)
  *H01M 10/6568* (2014.01)
  *F16L 41/03* (2006.01)
  *H01M 2/10* (2006.01)
  *H01M 10/48* (2006.01)

(52) U.S. Cl.
  CPC ............. *F16L 33/02* (2013.01); *F16L 33/025* (2013.01); *F16L 33/28* (2013.01); *F16L 41/03* (2013.01); *H01M 2/1077* (2013.01); *H01M 10/486* (2013.01); *H01M 10/6568* (2015.04); *H01M 2220/20* (2013.01)

(58) Field of Classification Search
  CPC .. H01M 10/613; H01M 10/625; F16L 11/121; F16L 11/122; F16L 33/02; F16L 33/025; F16L 33/28; F16L 41/03
  USPC .......................................................... 429/120
  See application file for complete search history.

(56) References Cited

U.S. PATENT DOCUMENTS

| | | | |
|---|---|---|---|
| 6,106,972 A * | 8/2000 | Kokubo | H01M 2/1083 429/120 |
| 6,116,657 A | 9/2000 | Oetiker | |
| 6,155,302 A | 12/2000 | Fischerkeller et al. | |
| 6,550,815 B2 | 4/2003 | Zitkowic, Jr. et al. | |
| 6,607,218 B2 | 8/2003 | Sakazaki et al. | |
| 6,712,098 B2 | 3/2004 | Sakazaki et al. | |
| 6,905,145 B2 | 6/2005 | Krauss et al. | |
| 7,464,968 B2 | 12/2008 | Sakazaki et al. | |
| 7,490,862 B2 | 2/2009 | Sakazaki et al. | |
| 7,846,573 B2 * | 12/2010 | Kelly | H01M 2/1077 138/118 |
| 2005/0087979 A1 | 4/2005 | Col | |
| 2005/0230971 A1 | 10/2005 | Salazaki et al. | |
| 2007/0035123 A1 * | 2/2007 | Holt | F16L 33/08 285/23 |
| 2008/0012299 A1 | 1/2008 | Kidman et al. | |
| 2009/0023056 A1 * | 1/2009 | Adams | F28D 1/0478 429/120 |
| 2011/0189511 A1 * | 8/2011 | Yoon | H01M 10/48 429/50 |
| 2012/0286506 A1 | 11/2012 | McKenzie | |

FOREIGN PATENT DOCUMENTS

| | | |
|---|---|---|
| DE | 20102973 | 7/2001 |
| DE | 10349527 | 5/2005 |
| EP | 1338840 | 8/2003 |
| EP | 1526317 | 4/2005 |
| FR | 2595437 | 9/1987 |

* cited by examiner

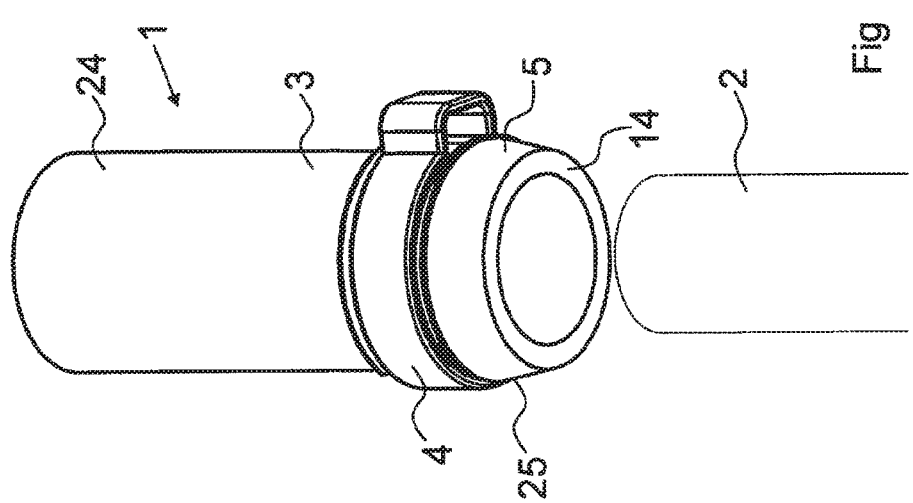
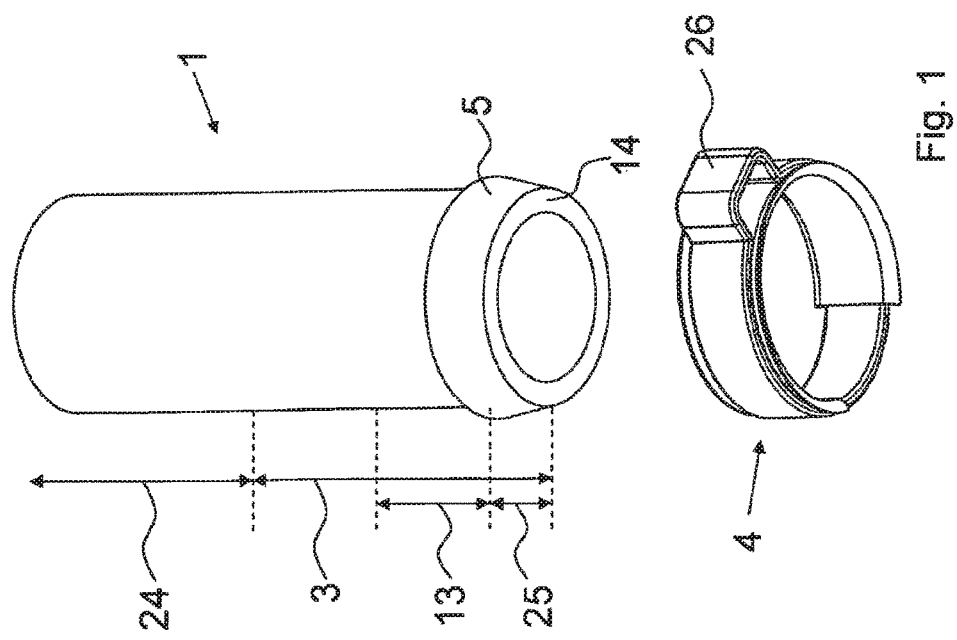

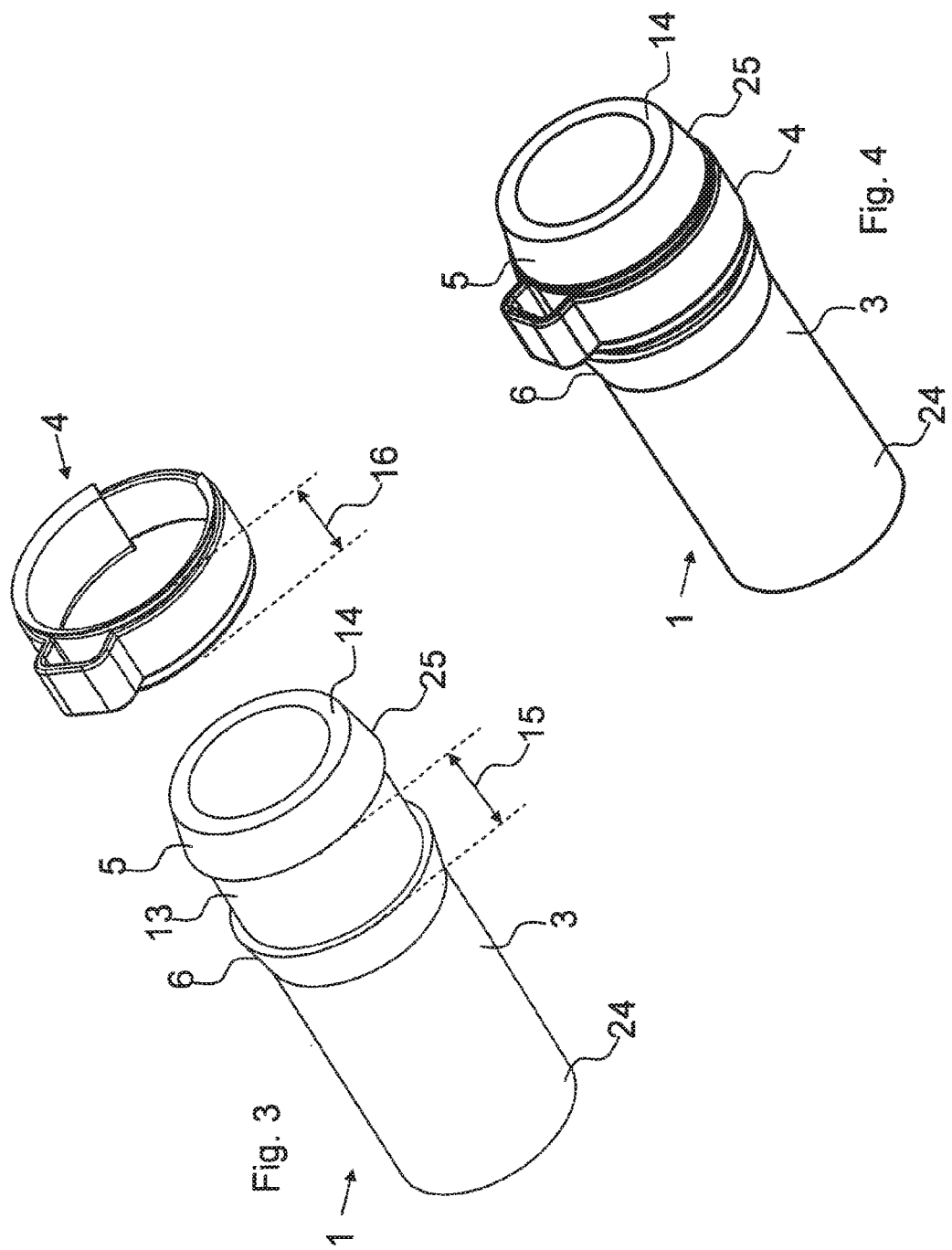

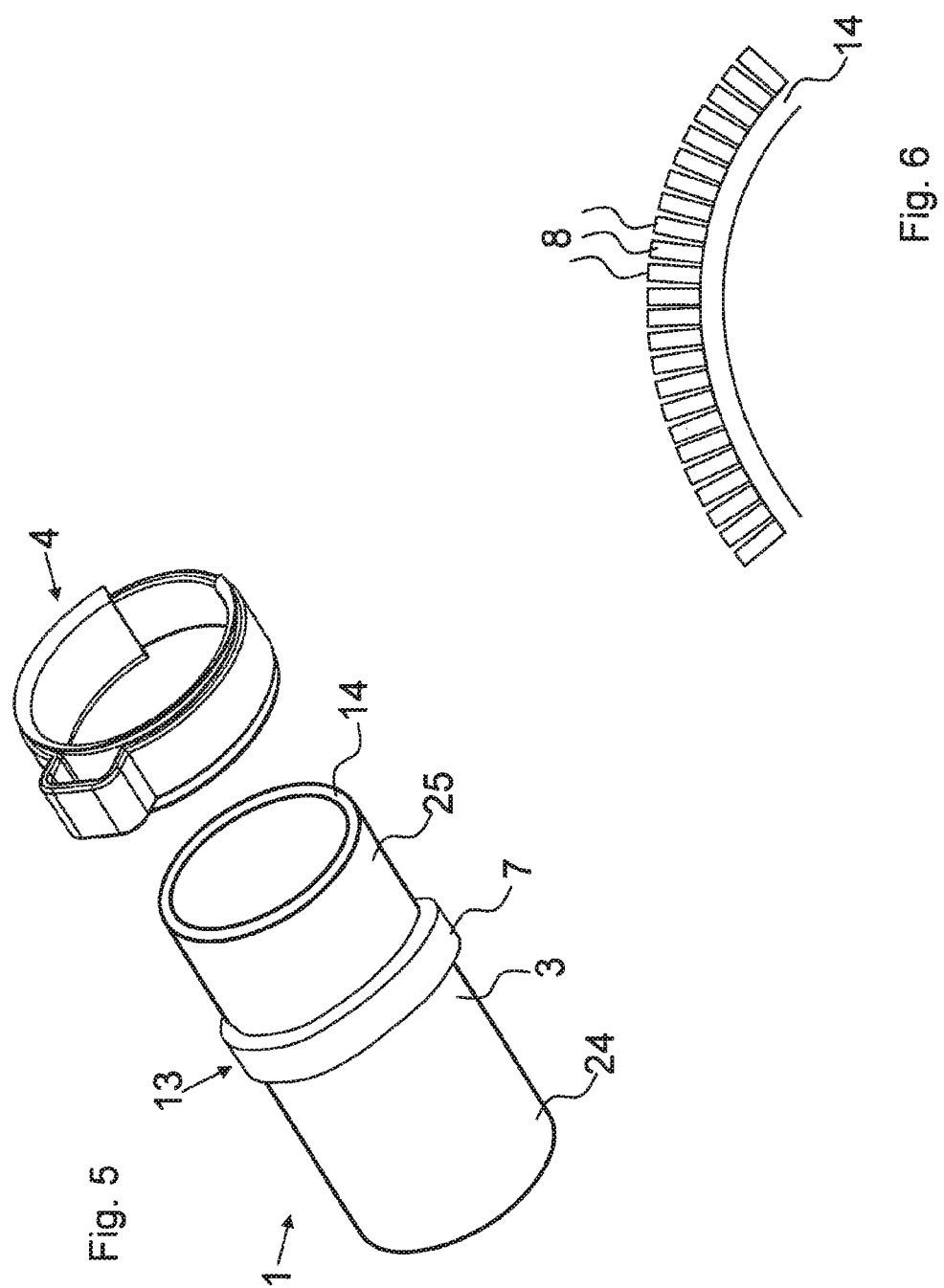

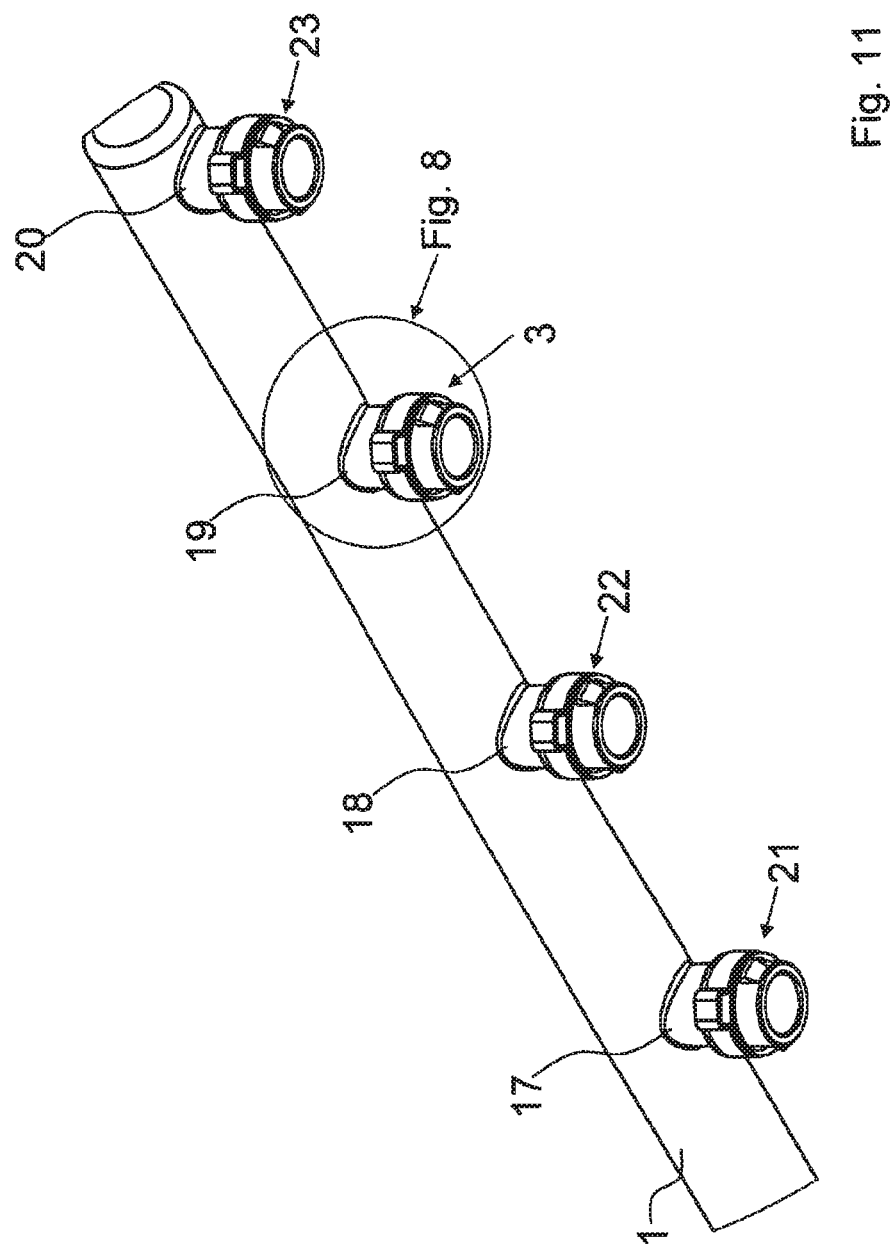

BATTERY SYSTEM WITH ELASTIC HOSE

CROSS REFERENCE TO RELATED APPLICATIONS

This application is a continuation of U.S. application Ser. No. 13/880,685, titled "HOSE MADE FROM AN ELASTIC MATERIAL," filed Apr. 19, 2013, now abandoned, which was the national stage of PCT Application No. PCT/EP2011/005113, filed on Oct. 12, 2011, which claimed priority from and benefit of German Patent DE 10 2010 049 015.6, filed on Oct. 21, 2010. Each of the foregoing applications is hereby incorporated by reference in its entirety herein.

BACKGROUND

The invention relates to a hose made from an elastic material according to the preamble of claim 1. The invention furthermore relates to a hose made from an elastic material, which comprises at least two branch-off points, according to claim 13. The invention furthermore relates to a use of such a hose for transporting a coolant for cooling batteries and to a battery arrangement for electric or hybrid vehicles.

When assembling a hose on a hose connector, a hose clip is frequently used in order to fix the hose on the hose connector and guarantee a secure and lasting seal. The work procedure usually consists in that the hose clip is firstly loosely pushed over the hose, a hose end piece then being pushed over the hose connector, then the hose clip being positioned and held in an assembly region in the region of the hose end piece and finally fastened. When fastening the hose clip, the latter is contracted so that through the hose clip the hose is pressed against the hose connector.

Such a hose clip fastening is known for example from DE 88 08 680 U1.

SUMMARY

The invention is based on the object of stating a hose with which the assembly by means of a hose clip described before is simplified. Furthermore, advantageous usage possibilities for such a hose are to be stated.

This object is solved through the invention stated in the claims 1, 13, 14 and 15. The subclaims state advantageous configurations of the invention.

The invention facilitates the assembly of hoses with hose clips. It is advantageous that the hose end piece is molded through at least one thickened portion protruding from the outside of the hose in such a manner that the hose clip prior to the final fixing, can be captively put on. Because of this, the hose clip is held in the position that is correct for the assembly and merely has to still be finally fixed, for example by tightening a clamping screw or crimping. Here, the thickened portion is formed in such a manner that a hose clip that is suitable for fastening the hose on the hose connector is held on the hose end piece by the thickened portion at least against the influence of gravity, when the latter is effective in the longitudinal direction of the hose end piece. The thickened portion in this case allows the hose clip to be pushed over because of the elasticity of the material of the hose or of the thickened portion used. In this way, the hose clip is securely held on the hose end at least with respect to the influence of gravity and cannot fall down.

The invention has a particularly positive effect on assembly times of hoses and the costs connected with this when a large number of hoses or hose end pieces have to be assembled on respective hose connectors, such as for example in the case of cooling liquid systems, wherein a larger quantity of cooling circuits has to be connected to the hose or a plurality of hose end pieces via separate hose connectors.

Exemplary applications can be found in the region of fluid-cooled battery arrangements for electric or hybrid vehicles, in the field of air-conditioning technology, in cooling systems for internal combustion engines of motor vehicles or in washing machines.

The thickened portion according to the invention can be molded highly differently in many configurations. It is significant that the thickened portion results in a shaping of the hose end piece such that the hose clip cannot by its own action easily leave a desired position. The thickened portion can for example be formed as one or a plurality of nubs or ring-shaped elevations with regular or irregular shaping. The surface of the thickened portion facing outward can be smooth or provided with a structure which can be nubbed or grained. One or a plurality of thickened portions can be provided.

Basically all elastic materials are possible as elastic material for the hose, in particular rubber-elastic materials and elastomers such as for example rubber or silicone. The thickened portion can be formed from the hose material or another suitable material. The thickened portion need not of necessity be produced in one piece with the hose. The thickened portion can also be inserted as an insert piece in a receiving location of the hose end piece. Advantageous, however, is a one-piece formation of the thickened portion with the hose in a uniform production process.

The thickened portion can be produced by adding additional materials to the hose end piece or by locally expanding the existing hose material. According to an advantageous development of the invention, the thickened portion runs completely about the outer circumference of the hose, for example in the form of a ring.

According to an advantageous development of the invention, the dimension by which the thickened portion protrudes from the outside of the hose, about the outer circumference of the hose, remains the same.

According to an advantageous development of the invention, the thickened portion is arranged in the assembly region of the hose clip. This has the advantage that even with a single thickened portion the hose clip can be held in its final assembly position. Advantageously, the thickened portion is formed running completely about the outer circumference of the hose, for example in ring form. It is likewise advantageous to configure the thickened portion in ring form, but with interruptions. Advantageous, in particular, is the configuration of the thickened portion in the form of a plurality of individual fins arranged about the outer circumference along a ring form, which protrude from the outside of the hose.

According to an advantageous development of the invention, at least two thickened portions are provided, which each run about the outer circumference of the hose sector-by-sector and each have the same spacing from the face end of the hose end piece. In a further advantageous development, the thickened portions are evenly spaced from one another in the circumferential direction of the hose. Advantageously, more than two thickened portions can also be provided, for example three to eight.

According to an advantageous development of the invention, the thickened portion, viewed from the face end of the hose end piece, is arranged in front of the assembly region for the hose clip. This has the advantage that the hose clip can be initially pushed over the thickened portion and then, without there being the risk of the hose clip falling off the hose end piece, the hose end piece can be pushed over the hose connector. Insofar as the hose end piece is effected with a spatial orientation in which the face end points in the direction of gravity, the hose clip is quasi automatically located also in the correct location of the hose end piece, namely in the assembly region. A further manual adjustment can thus be omitted. Because of this, a hose assembly with the face end of the hose end piece facing downward is particularly facilitated.

According to an advantageous development of the invention, the thickened portion, viewed from the face end of the hose end piece, is arranged behind the assembly region for the hose clip. This has the advantage that through the thickened portion slipping away of the hose clip into a hose section located further away from the face end of the hose end piece is prevented. In particular in the presence of a gravity component during the assembly of the hose clip away from the face end the advantage arises that the hose clip is held in its assembly position in the assembly region of the hose end piece.

It is likewise advantageous to provide both a thickened portion in front of the assembly region as well as a further thickened portion behind the assembly region. Because of this, the hose clip can be fixed in both directions.

According to an advantageous development of the invention, at least one first thickened portion, viewed from the face end of the hose end piece, is arranged in front of the assembly region for the hose clip. At least one second thickened portion, viewed from the face end of the hose end piece, is arranged behind the assembly region for the hose clip. The spacing between the first and the second thickened portion is equal in size or slightly larger than the width of the hose clip. Because of this, the hose clip is fixed in a certain position and has only little or no play in the longitudinal direction of the hose end piece.

According to an advantageous development of the invention, the dimension by which the thickened portion protrudes from the outside of the hose decreases in the direction of the face end of the hose end piece. The decrease can run for example linearly or in the shape of an arc. Because of this, a certain slope of the thickened portion in the direction of the face end is provided, which facilitates the placing and guiding of the hose clip over the thickened portion as far as into the assembly region.

According to an advantageous development of the invention, the sum of the outer diameter of the hose end piece and the dimension by which the thickened portion protrudes from the outside of the hose is greater than the inner diameter of the hose clip in the loose state. Loose state is understood to mean the state of the hose clip as delivered. This has the advantage that a secure hold of the hose clip on the hose end piece is made possible.

According to an advantageous development of the invention, the thickened portion completely runs about the outer circumference of the hose, has a circular outer contour viewing the face end of the hose end piece from the top and has a diameter which is larger than the inner diameter of the hose clip in the loose state. This allows a simple production of the thickened portion.

According to an advantageous development of the invention, the dimension by which the thickened portion protrudes from the outside of the hose is in the range from 1 to 4 mm. This has the advantage that the use of hose clips with standard diameters is favored. For each usual hose diameter, a suitable hose clip with a standard diameter can be selected. Said hose clip can then be pushed over the thickened portion comfortably and without damage and is additionally held by the thickened portion once pushed over.

According to an advantageous development of the invention, the hose comprises at least two branch-off points. On each of the branch-off points, a hose section having in each case a hose end piece is arranged. Such a hose can advantageously be used as a distribution hose (manifold), for example for passing on and distributing cooling fluid. The hose, in particular, can be provided with a larger number of branch-off points, for example 6 or 10. Through the respective thickened portions provided on the hose end pieces, the assembly of such a hose by means of hose clips is facilitated and accelerated.

In addition, all previously described embodiments of the hose or of the thickened portions can be advantageously inter-combined.

The invention additionally relates to a hose made from an elastic material, wherein the hose comprises at least two branch-off points, on each of which a hose section having in each case a hose end piece is arranged, which is formed for assembly on a hose connector by pushing the hose end piece over the hose connector and for fastening on the hose connector by a hose clip to be arranged in the region of the hose end piece. Such a hose is advantageously suitable as a distribution hose for coolant, e.g. a cooling fluid, for example for cooling batteries for electric or hybrid vehicles.

The invention therefore also relates to a use of a hose of the type mentioned before for transporting a coolant for cooling batteries, in particular for electric or hybrid vehicles.

The invention furthermore relates to a battery arrangement for electric or hybrid vehicles with a plurality of individual battery elements, each of which comprises a coolant supply connection and a coolant discharge connection, wherein the coolant supply connections are interconnected and to a coolant source via a hose of the type described before and/or the coolant discharge connections are interconnected and connected to a coolant sink via a hose of the type described above. Each battery element can for example comprise a plurality of cylindrical round cells or prismatic cells.

DRAWINGS

In the following, the invention is explained in more detail by means of exemplary embodiments making use of drawings, in which:

FIG. 1 shows a hose and a hose clip and

FIG. 2 shows the hose according to FIG. 1 with fitted hose clip and

FIG. 3 shows a further embodiment of a hose and a hose clip and

FIG. 4 shows the hose according to FIG. 3 with fitted hose clip and

FIG. 5 shows a further embodiment of a hose and a hose clip and

FIG. 6 shows a hose segment in cross section and

FIG. 11 shows a further embodiment of a hose with fitted hose clips and

DETAILED DESCRIPTION

Figure 8:
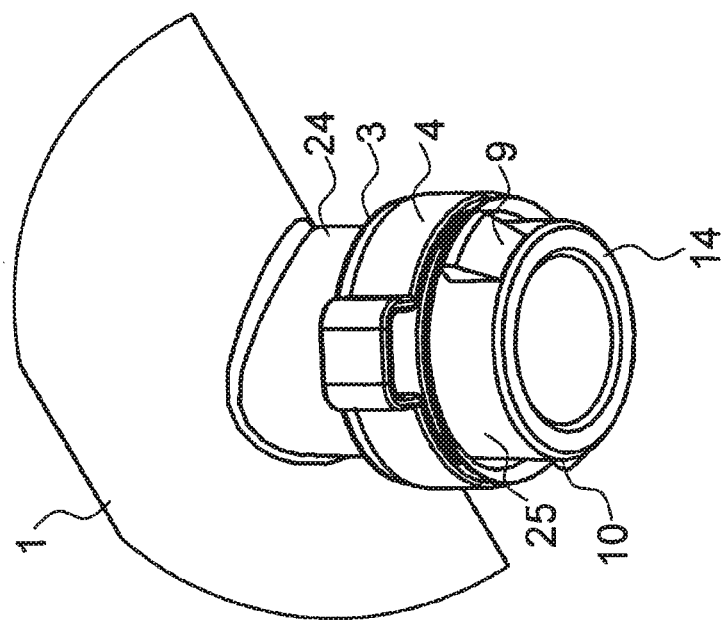
FIG. 8 shows the hose according to FIG. 7 with fitted hose clip.

In the Figures, the same reference characters are used for corresponding elements.

FIG. 1 shows a hose 1 and a hose clip 4. The hose 1 comprises a hose end piece 3, in which the hose 1 ends on an end face 14. In the direction facing away from the end face 14, the hose 1, on the other side of the hose end piece 3, extends over a hose section 24, which depending on the application can have a different length and in the Figures is only shown as a short hose piece for the sake of clarity. The hose end piece comprises an assembly region 13 for a hose clip 4. The hose clip 4 is pushed over the hose end piece 3 as far as into the assembly region 13 and can then be fixed. In general, the hose 1 comprises a hose section 25 protruding over the assembly region 13 toward the end face 14, since as a rule it is desirable that the hose clip is not assembled on the outermost end of the hose end piece 3.

The hose 1 according to FIG. 1 comprises a thickened portion 5 formed from the hose material protruding on the outside of the hose 1 in the hose section 25, which seen from the end face 14 is located in front of the assembly section 13. The thickened portion 5 is formed radially circumferentially about the outer circumference of the hose end piece 3. In the shown embodiment, the thickened portion 5 is formed with a taper in the direction of the end face 14, e.g. in the shape of a truncated cone.

The hose clip 4 likewise shown in FIG. 1 is of the crimping type. To this end, the hose clip 4 comprises a crimping region 25, which for fastening the hose clip 4 on the hose 1 is pressed together with a suitable tool. This reduces the diameter of the hose clip, which results in the hose being fixed on a hose connector.

FIG. 2 shows the hose 1 and the hose clip 4 according to FIG. 1 with the hose clip 4 already pushed onto the hose 1. In addition, a hose connector 2 is shown, onto which the hose 1 with the hose clip 4 is to be pushed.

FIG. 3 shows a further embodiment of a hose 1, which additionally to the thickened portion 5 in the hose section 25, a further additional thickened portion 6 is arranged in a region of the hose end piece 3 located further away from the face end 14. The further thickened portion 6 in this case is arranged seen from the face end 14 behind the assembly region 13 for the hose clip 4. Here, the spacing 15 between the thickened portions 5, 6 is selected so that it is equal in size or slightly larger than the width 16 of the hose clip 4. Because of this, the hose clip 4 can be easily positioned in the assembly region 13 between the two thickened portions 5,6 and is prevented by the two thickened portions 5, 6 from being undesirably displaced in both directions in the longitudinal direction of the hose 1.

FIG. 4 shows the hose 1 and the hose clip 4 according to FIG. 3 with the hose clip 4 pushed over the hose 1.

FIG. 5 shows a further embodiment of a hose 1, in which a thickened portion 7 of ring-like shape is formed on the hose end piece 3, namely in the assembly region 13 for the hose clip 4.

The hose clip 4 in this case can be pushed over the thickened portion 7 with a slight exertion of force and because of the elasticity of the material of the thickened portion 7 and of the hose 1 is held in the respective position through pressure.

As shown in FIG. 5, the thickened portion 7 can be formed as a circumferential ring without interruptions. FIG. 6 shows an alternative configuration of the thickened portion 7, in which a multiplicity of small fins 8, which are arranged closely together, protrude from the outside of the hose 1. Here, the hose 1 is shown in a view of the end face 14 from the top, wherein FIG. 6 only shows a sector-like detail.

Figure 7:
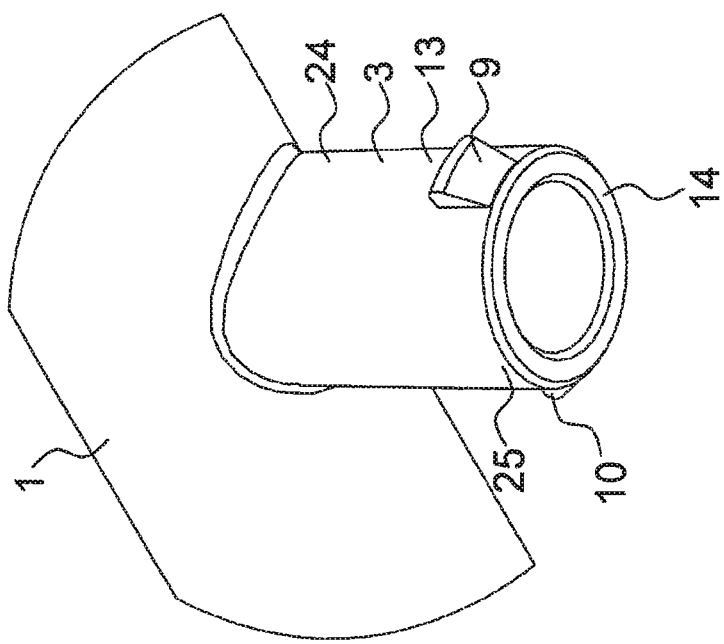
FIG. 7 shows a further embodiment of a hose.

FIG. 7 shows a further embodiment of a hose 1, in which the hose end piece 3 branches off the hose 1 at an angle. Furthermore, a further embodiment of the mentioned thickened portions is shown by means of FIG. 7, namely two thickened portions 9, 10 radially located opposite each other, which starting out from the end face 14 are arranged in front of the assembly region 13. The thickened portions 9, 10 are formed approximately in the manner of a circular segment and have a profile extending tapered in the longitudinal direction of the hose end piece 3 in such a manner that starting out from the end face 14, an approximately ramp-like rise of the height of the thickened portions 9, 10 is obtained.

FIG. 8 shows the hose 1 according to FIG. 7 with the hose clip 4 pushed over the hose end piece 3.

Figure 9:
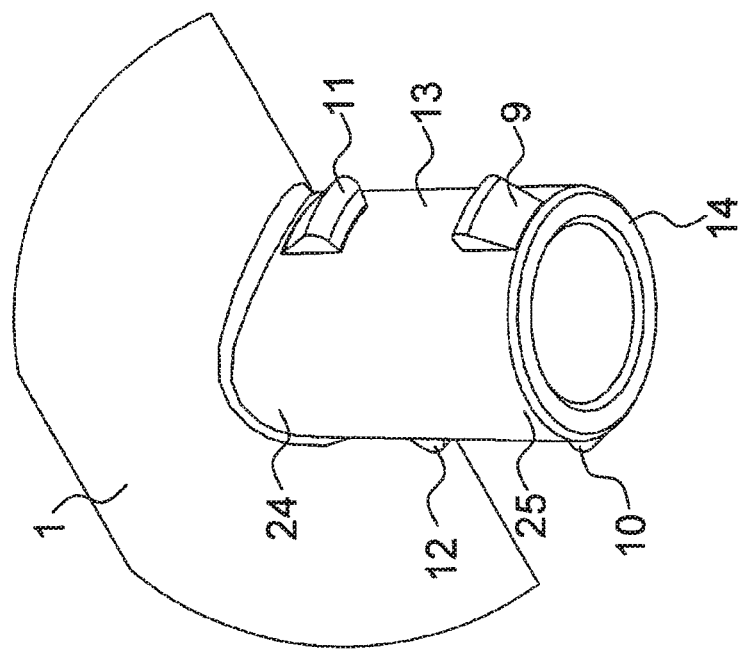
FIG. 9 shows a further embodiment of a hose.

FIG. 9 shows a further embodiment of a hose. In contrast with FIG. 7, further thickened portions 11, 12 are provided apart from the thickened portions 9, 10 in the hose section 25 of the hose end piece 3, which, starting out from the end face 14, are arranged behind the assembly region 13. The thickened portions 11, 12 are substantially formed with the same shaping as the thickened portions 9, 10, but with their sloping contour in the opposite direction to that of the thickened portions 9, 10.

Figure 10:
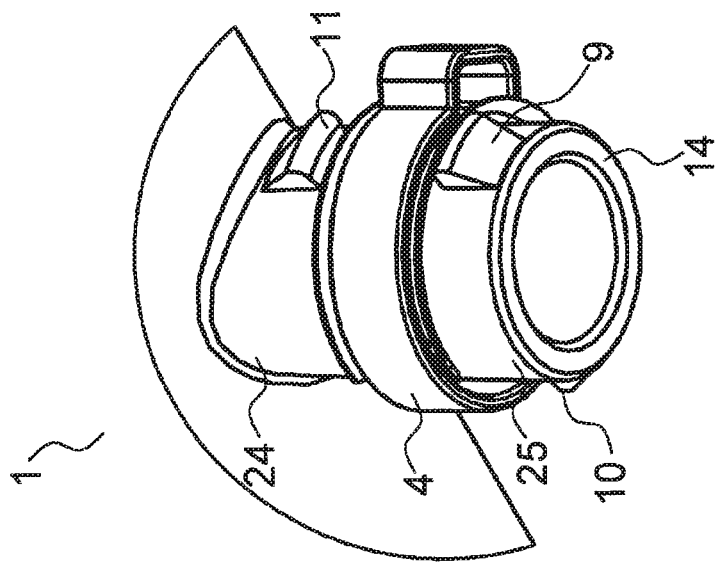
FIG. 10 shows the hose according to FIG. 9 with fitted hose clip.

FIG. 10 shows the hose 1 according to FIG. 9 with the hose clip 4 pushed over the hose end piece 3.

FIG. 11 shows a hose 1 with a plurality of branch-off points 17, 18, 19, 20, wherein in FIG. 11, four branch-off points are shown, however more or fewer branch-off points can also be advantageously realized. The branch-off points 17, 18, 19, 20 each have a hose end piece 3, 21, 22, 23. The hose end pieces 3, 21, 22, 23 are formed with thickened portions of the type described before, wherein in FIG. 11, the embodiment according to FIG. 8 is exemplarily shown. However, the other described embodiments can also be provided. Hose clips are pushed over the hose end pieces 3, 21, 22, 23 in each case.

Figure 12:
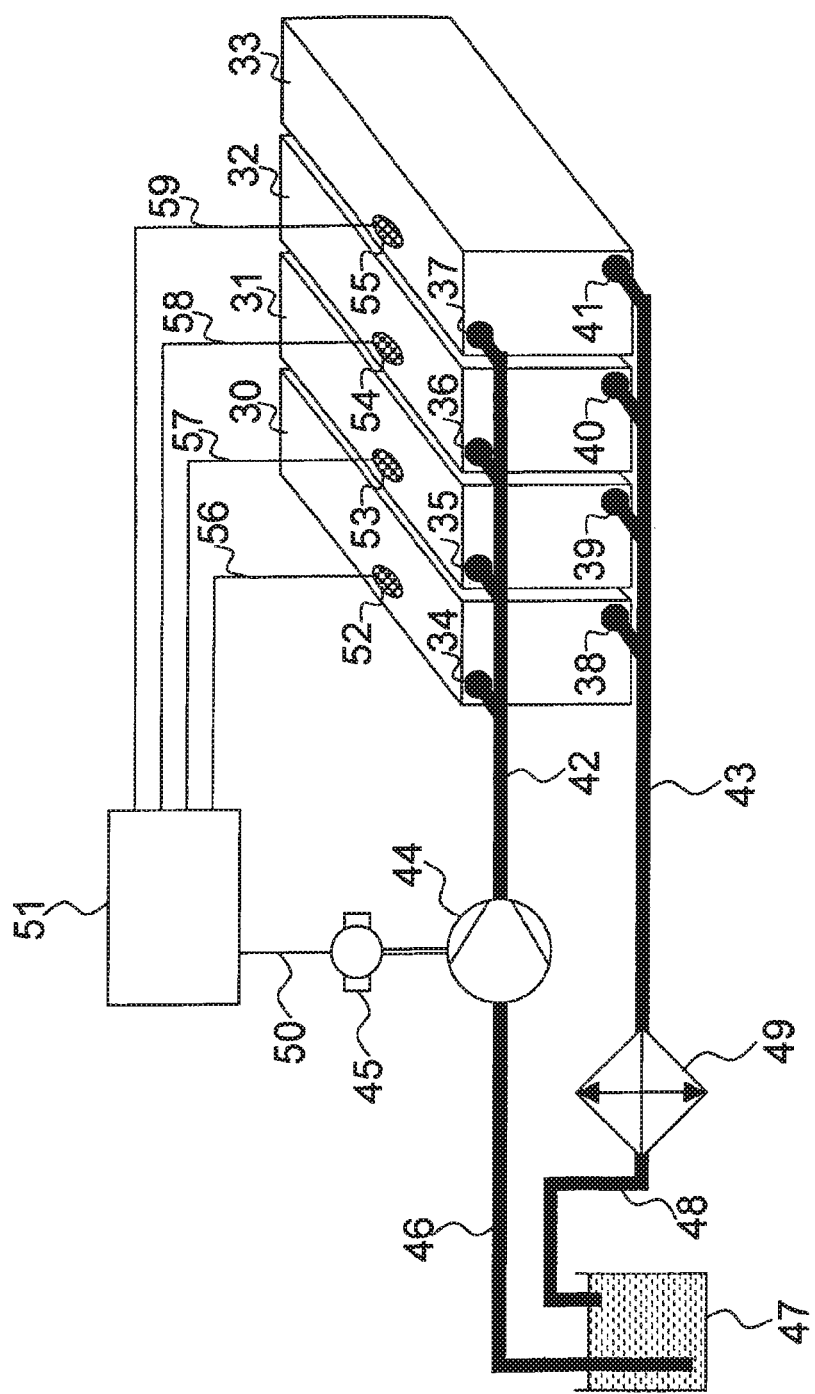
FIG. 12 shows a battery arrangement for electric or hybrid vehicles.

FIG. 12 shows a battery arrangement for electric or hybrid vehicles. The battery arrangement comprises a plurality of battery elements 30, 31, 32, 33, wherein in FIG. 12 four battery elements are exemplarily shown, but more or fewer battery elements are also advantageously possible. The battery elements 30, 31, 32, 33 contain a plurality of individual battery cells, which require cooling in operation. For this reason, each battery element 30, 31, 32, 33 has an internal coolant distribution. For supplying the coolant, each battery element 30, 31, 32, 33 has its own coolant supply connection 34, 35, 36, 37. For discharging the coolant which has flowed through the respective battery element 30, 31, 32, 33, each battery element comprises a coolant discharge connection 38, 39, 40, 41. The coolant supply connections and the coolant discharge connections are each formed with a hose connector, which serves for assembling a hose for the supply and discharge of the coolant. The coolant supply connections 34, 35, 36, 37 are connected to a coolant source 44, 47 via a hose 42 of the type described before, in particular a hose according to FIG. 11. The coolant source 44, 47 comprises for example a cooling fluid pump 44 and cooling fluid reservoirs 47. Here, the hose 42 is connected to the cooling fluid pump 44. The cooling fluid pump 44 on the inlet side is in turn connected to a cooling fluid reservoir 47 via a further hose 46. The coolant discharge connections 38, 39, 40, 41 are connected to a coolant sink 47, 49 via a hose 43 of the type described before, in particular a hose according to FIG. 11. The coolant sink 47, 49 comprises for example a heat exchanger 49 and the cooling fluid reservoir 47. The hose 43 in this case is connected to an inlet connection of the heat exchanger 49. The heat exchanger 49 can for example be formed as a cooler. On the outlet side, the heat exchanger 49 is connected to the cooling fluid reservoir 47 via a further hose 48.

The battery arrangement according to FIG. 12 additionally comprises an electronic control unit 51, which monitors the temperature of the battery elements 30, 31, 32, 33 and dependent on this, controls the cooling fluid pump 44. To this end, each of the battery elements 30, 31, 32, 33 is provided with a temperature sensor 52, 53, 54, 55.

The temperature sensors 52, 53, 54, 55 are connected to the electronic control unit 51 via respective electric lines 56, 57, 58, 59. In addition, the electronic control unit 51 is connected to an electric motor 45 via an electric line 50. The electric motor 45 is connected to the cooling fluid pump 44 via a shaft. The electric motor 45 serves for driving the cooling fluid pump 44. The electronic control device controls the electric motor 55, e.g. via rotational speed control in such a manner that the battery elements 30, 31, 32, 33 are adequately supplied with the cooling fluid and the developing heat is discharged so that none of the battery elements 30, 31, 32, 33 is impermissibly heated up.

The invention claimed is:

1. A battery system, comprising:
   a first battery element having a first plurality of battery cells;
   a second battery element having a second plurality of battery cells;
   a battery cooling hose comprising a first end piece disposed at a first branch-off point of the battery cooling hose and configured to fluidly couple the battery cooling hose with the first battery element, and a second end piece disposed at a second branch-off point of the battery cooling hose and configured to fluidly couple the battery cooling hose with the second battery element;
   a main body of the first end piece and a protrusion of the first end piece extending outward from an outer surface of the main body of the first end piece;
   a main body of the second end piece and a protrusion of the second end piece extending outward from an outer surface of the main body of the second end piece;
   a first hose connector configured to couple between the first end piece and the first battery element;
   a second hose connector configured to couple between the second end piece and the second battery element;
   a first clip configured to maintain a coupling between the first end piece and the first hose connector, wherein the protrusion of the first end piece is configured to retain the first clip on the first end piece;
   a second clip configured to maintain a coupling between the second end piece and the second hose connector, wherein the protrusion of the second end piece is configured to retain the second clip on the second end piece; and
   an additional battery cooling hose comprising:
      an additional first end piece disposed at an additional first branch-off point of the additional battery cooling hose and configured to fluidly couple the additional battery cooling hose with the first battery element; and
      an additional second end piece disposed at an additional second branch-off point of the additional battery cooling hose and configured to fluidly couple the additional battery cooling hose with the second battery element, an additional first hose connector is configured to couple between the additional first end piece and the first battery element, an additional second hose connector is configured to couple between the additional second end piece and the second battery element; and
   the battery cooling hose is configured to be an inlet manifold to the first and second battery elements, and the additional battery cooling hose is configured to be an outlet header of the first and second battery elements.

2. The battery system of claim 1, wherein the first battery element comprises the first hose connector, and wherein the second battery element comprises the second hose connector.

3. The battery system of claim 1, wherein the protrusion of the first end piece comprises an outermost diameter greater than an inner diameter of the first clip.

4. The battery system of claim 1, wherein the first clip comprises an inner diameter that is adjustable.

5. The battery system of claim 4, wherein the first clip comprises a crimping region that, when crimped, is configured to reduce the inner diameter of the first clip such that an inner surface of the first clip comprising the inner diameter exerts a compressive force against the outer surface of the main body of the first end piece, wherein the compressive force is configured to maintain the coupling between the first end piece and the first hose connector.

6. The battery system of claim 1, wherein the protrusion of the first end piece is tapered outwardly from an end face of the first end piece toward the first branch-off point such that the protrusion of the first end piece comprises a diameter that tapers down toward the end face of the first end piece.

7. The battery system of claim 1, wherein the protrusion of the first end piece is circumferentially segmented into a first portion and a second portion disposed on opposing sides of the first end piece.

8. The battery system of claim 1, wherein the first end piece comprises an additional protrusion disposed longitudinally adjacent the protrusion of the first end piece with respect to a longitudinal axis of the first end piece, wherein the protrusion of the first end piece and the additional protrusion of the first end piece are separated by an assembly region of the first end piece, and wherein the assembly region of the first end piece is configured to receive the first clip.

9. The battery system of claim 1, wherein the battery cooling hose comprises an inner surface having an elastic material configured to directly contact a coolant of the battery system.

10. The battery system of claim 1, wherein the battery cooling hose comprises an elastic material.

11. The battery system of claim 1, comprising a coolant source configured to supply a coolant to the battery cooling hose, wherein the battery cooling hose is configured to supply the coolant to the first end piece and the second end piece, wherein the first end piece is configured to supply the coolant to the first battery element via the first hose connector, and wherein the second end piece is configured to supply the coolant to the second battery element via the second hose connector.

12. The battery system of claim 1, comprising an electronic control unit that:

receives data indicative of a first temperature of the first battery element, of a second temperature of the second battery element, or both; and controls, based on the data, a flow of coolant toward the first battery element, toward the second battery element, or both.

* * * * *